(No Model.)
J. O'MEARA.
ELECTRIC COOKING APPARATUS.
No. 446,174. Patented Feb. 10, 1891.
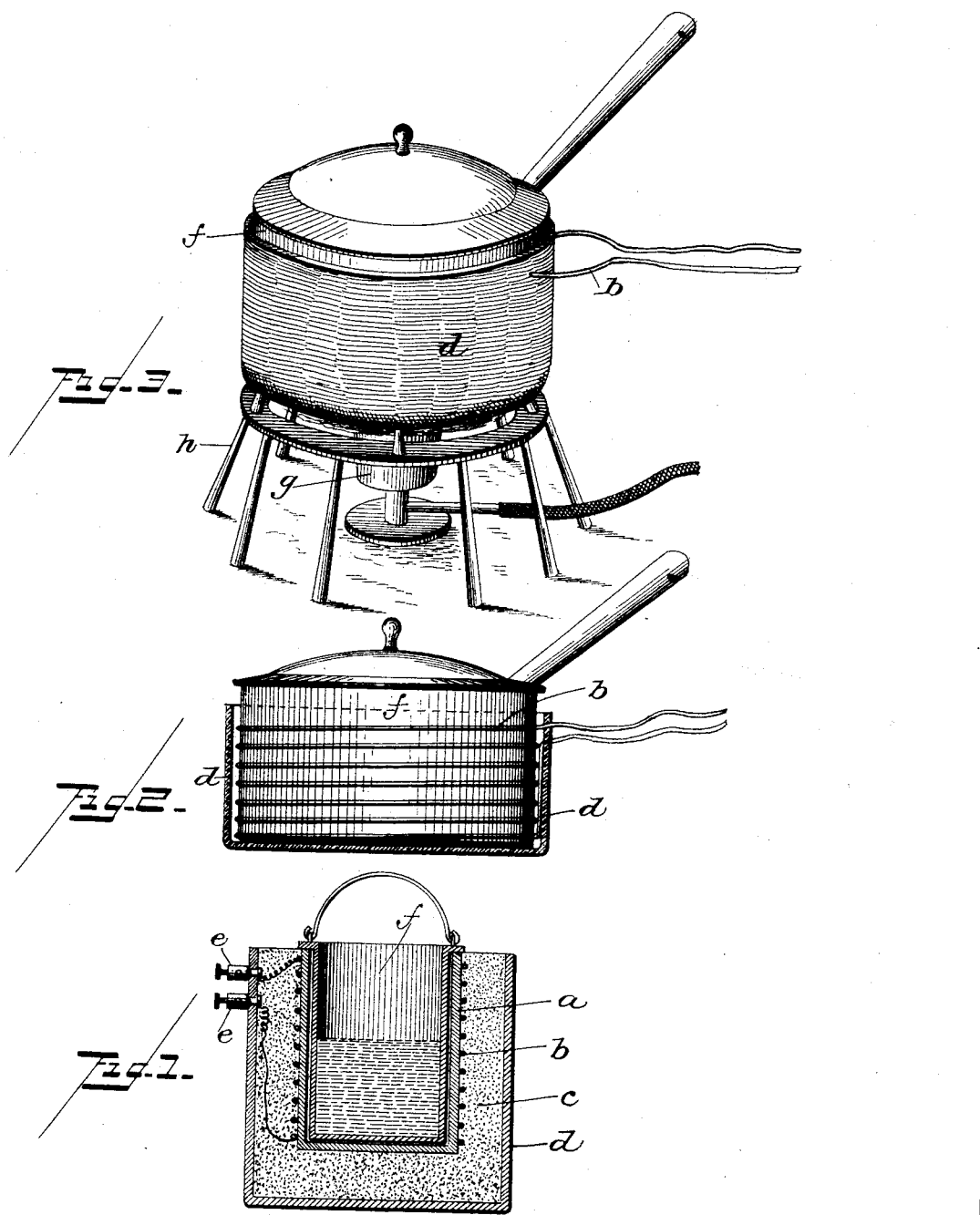

UNITED STATES PATENT OFFICE.

JEREMIAH O'MEARA, OF NEW YORK, N. Y.

ELECTRIC COOKING APPARATUS.

SPECIFICATION forming part of Letters Patent No. 446,174, dated February 10, 1891.

Application filed May 1, 1890. Serial No. 350,136. (No model.)

*To all whom it may concern:*

Be it known that I, JEREMIAH O'MEARA, a citizen of the United States, residing at New York, in the county of New York and State of New York, have invented a certain new and useful Improvement in Cooking Apparatus, of which the following is a full, clear, and exact description.

The object of this invention is to utilize ordinary electric currents—such as lighting-currents—for heating purposes.

In practicing my invention I employ an enameled vessel, such as the ordinary graniteware, or agate-ware, or porcelain-ware, in each of which there is a metallic body provided with a superficial enamel or glaze, and about this vessel I arrange a suitable length of German-silver wire, which is adapted to be connected to proper conductors and to become heated therefrom, and to transmit the heat to the vessel without transmitting the electric current itself to such vessel. The German-silver wires, of course, will be properly insulated or covered, so as to protect the users of the vessel.

In the accompanying drawings, illustrating my invention, in the several figures of which like parts are similarly designated, Figure 1 is a sectional elevation of one form of my invention. Fig. 2 is a similar view of another form; and Fig. 3 is a perspective view illustrating, also, the fact that there is nothing in the invention prohibiting the use of a Bunsen or other burner or flame, either as an auxiliary or as a substitute.

Referring now to Fig. 1, the letter $a$ may represent the enameled vessel, about which is wound or coiled the German-silver wires $b$. $c$ is a casing made of clay or asbestus or other suitable non-conductor, and $d$ is an external jacket of any suitable material. This external jacket may be provided with binding-posts $e\ e$ for connecting the German-silver wires with the source of electricity. $f$ is a vessel which may be inserted within the enameled vessel and may contain any article to be cooked or heated. As will be understood, the heating is done by radiation.

In Fig. 2 the vessel $f$ is the enameled vessel, and if its external surface is ribbed or otherwise roughened the wires $b$ may be applied directly thereto, and then an external jacket $d$, of suitable electrically non-conductive material, may be applied externally of the wires.

As shown in Fig. 3, a Bunsen burner or other heating agent $g$ may be applied to the vessel as an auxiliary to the electric heating-current, or as a substitute for it when such current is not available. I have shown for convenience the vessel as mounted upon the stand $h$ and used in connection with a Bunsen burner.

In case the external surface of the enameled vessel be not rough, then the German-silver wires will be supported by embedment in the asbestus or other non-conducting jacket $d$.

I have found that the best heating results are obtained from German-silver wires of a given length per volt by twisting a number of strands of the wire together, and I have found this twisting of the wires to be exceedingly useful in obtaining a large heating-surface of small compass; but I do not herein claim this feature, inasmuch as it forms the subject of my application for patent for electric-heating coil, filed October 22, 1890, Serial No. 368,960.

The arrangement of switches and safety-plugs for use in connection with this apparatus may be such or substantially such as shown in my patent, No. 419,282, dated January 14, 1890.

I do not limit the application of my invention to cooking apparatus. It is adapted for heating purposes generally, and among other uses it may be employed with advantage for heating water and other matter for doctors' and dentists' uses.

In any case the vessel having the wires applied thereto is portable and may be carried about to any place where the energizing-current may be had and may rest upon any support while heating.

In my experiments I have found that about sixty feet of wire (about a pin thickness) carrying a current of fifty volts will give good heating effects, while more than sixty feet seem to yield very negative results, and less than forty feet yield so much heat as to burn the wire. If the wire be not supported, then when the current is on the expansion of the wire will result in its coils sagging and coming into contact, and so destroying itself.

What I claim is—

1. A portable heating apparatus comprising an enameled vessel, a heating-coil of German-silver or other electrically-conductive wires surrounding the said enameled vessel externally, and an external electrically non-conductive casing surrounding the wires, substantially as described.

2. A portable heating apparatus comprising a case or jacket, an enameled vessel, and interposed electric conductors arranged externally of the enameled vessel, substantially as described, whereby the said apparatus may be used with an electric or other heating agent, or both, as set forth.

3. A portable heating apparatus comprising an enameled vessel, a heating-coil of German-silver or other electrically-conductive wire supported upon and by the said enameled vessel, and an external insulating-casing, substantially as described.

In testimony whereof I have hereunto set my hand this 21st day of April, A. D. 1890.

JEREMIAH O'MEARA.

Witnesses:
WALTER L. CLARK,
ALFRED C. CLARK.